United States Patent [19]

Blessing, Sr.

[11] Patent Number: 4,730,395
[45] Date of Patent: Mar. 15, 1988

[54] APPARATUS FOR CUTTING HOLES FOR ELECTRICAL WALL OUTLETS IN WALL COVERING PANELS

[76] Inventor: William R. Blessing, Sr., 95 Saddle Mountain Rd., Colorado Springs, Colo. 80919

[21] Appl. No.: 726,037

[22] Filed: Apr. 22, 1985

[51] Int. Cl.$^4$ ............................................... B26F 1/00
[52] U.S. Cl. ........................................ 30/360; 30/362; 30/366
[58] Field of Search .................. 30/360, 361, 362, 366

[56] References Cited

U.S. PATENT DOCUMENTS

| | | | |
|---|---|---|---|
| 3,391,460 | 7/1968 | Moore | 30/366 X |
| 4,087,913 | 5/1978 | Jackson | 30/360 |

Primary Examiner—E. R. Kazenske
Assistant Examiner—Michael D. Folkerts

[57] ABSTRACT

A dry wall and masonary cutting tool comprised of an interior cutting box, the interior cutting box having a plurality of forward facing teeth for cutting a dry wall panel, a pair of locating nails for precisely locating the interior cutting box with respect to an exterior cutting box and, a pair retaining clips for retaining the interior cutting tool in the receptacle and a center threaded passage for accepting a threaded connecting screw; an exterior cutting box, the threaded connecting shaft and hole cooperating to pull the interior and exterior box together to cut the hole in the dry wall material; and a compression spring to push the threaded connecting shaft to an outward position when not engaged in drilling. In operation, the interior cutting box is placed in a wall receptacle, the panel pressed into place, the exterior cutting box positioned on the locating nails, and a hole drilled through the panel. The threaded connecting shaft engages the threaded hole in the exterior cutting teeth to cut through the panel. Once fully cut, the entire tool along with the cut material is removed from the wall.

1 Claim, 5 Drawing Figures

APPARATUS FOR CUTTING HOLES FOR ELECTRICAL WALL OUTLETS IN WALL COVERING PANELS

BACKGROUND OF THE INVENTION

This invention relates to the field of building construction tools and in particular to tools for cutting predetermined shapes into interior dry-wall and masonary wall and ceiling panels.

In the interior building construction industry, when finishing the interior walls, it is customary to cover the interior walls with a smooth flat surface such as a masonary or dry-wall panel or board. When mounting such panels, it is necessary to cut holes in the panels in order to provide openings for various wall fixtures such as electrical wall outlets or switches.

As presently practiced, the crew mounting the panels will ordinarily measure the position of the fixture as positioned on the wall or ceiling. The crew will then measure the panel, marking it where the outlet fixture should pass through the panel. The crew will then use a conventional cutting tool such as a hacksaw to cut the appropriately shaped opening in the panel. The panel is then attached to the wall or ceiling. Ideally, the opening for the fixture is correctly positioned.

However, for a number of reasons, the hole cut in the panel may not match the exact position of the outlet on the wall or ceiling. Errors such as mis-measurement of the exact position of the wall outlet itself, mis-measurement of the panel, or incorrect cutting of the panel itself, often results in a mis-alignment of the opening cut in the panel with respect to the wall fixture.

When this occurs, if the error is minor, the crew can manually cut and shape the opening so as to clearly and fully expose the fixture. The extra, exposed, area can be patched over. However, if the cut is too far out of alignment, the panel may not be useable. The above described procedure can provide for misaligned holes which can be expensive to repair and cn also cause additional problems in properly aligning the panels with respect to one another. Additionally, it can take significant time to precisely measure and cut the holes in the panels.

To date, the only solution readily available has been to simply use special care in measuring and cutting the opening to be made in the panel. What is needed then is an apparatus and method for rapidly and precisely cutting holes for wall and ceiling fixtures in dry-wall and masonary panels.

The present invention provides just such an apparatus and method.

It is an object of this invention to provide a means for precisely cutting predetermined shapes in dry wall and masonary panels.

It is another object of this invention to provide a means for rapidly and precisely cutting predetermined shapes in dry wall and masonary panels.

BRIEF SUMMARY OF THE INVENTION

A dry wall and masonary hole cutting tool comprised of an interior and an exterior cutting box. The interior and exterior cutting boxes respectively have outward and inward projecting teeth which are configured so as to cooperate in cutting the hole of predetermined size and shape in the dry-wall or masonary material.

The interior cutting box has attached thereto a pair of retaining clips for retaining the interior cutting box in the wall or ceiling receptacle; a pair of locating nail for punching through the panel once the panel is pressed into place along the wall [in order to facilitate precise positioning of the exterior cutting box]; and, a threaded hole for allowing threaded connection of a threaded connecting shaft from the exterior cutting box.

The exterior cutting box has attached thereto, a threaded connecting shaft which is attached to the exterior cutting box by means of a bracket for that purpose. A compression spring disposed around the threaded connecting shaft in order to generally return the threaded connecting shaft to an outward position. The exterior cutting box has a pair of locating holes which allow the close passage of the locating nails, and also has a center hole for passage of the threaded connecting shaft.

In operation, the interior cutting box is placed in the wall or ceiling receptacle for which the hole is to be cut. The panel is pressed into place over the receptacle causing the locating nails to punch through the dry-wall or masonary panel material. The exterior cutting box is then positioned on the locating nails, thus precisely positioning the exterior cutting box with respect to the interior cutting box. A drill is then attached to the outward projecting end of the threaded connecting screw and a hole drilled through the panel. As drilling is continued through the panel, the threaded connecting shaft's threaded inward projecting end engages the threaded hole of the interior cutting box. The drill is continued to operate causing the exterior and interior cutting box teeth to cut through the panel material. Once the panel has been fully cut, the drill is stopped and the entire tool is removed from the receptacle also pulling out the cut material. Once the cut material is removed from the tool, the tool is free to be re-used in the next location.

DETAILED DESCRIPTION OF THE PREFERRED EMBODIMENT

In the preferred embodiment, the disclosed invention, a dry wall and masonary hole cutting tool 1, is comprised of an interior cutting box 2 and an exterior cutting box 3.

Figure 1:
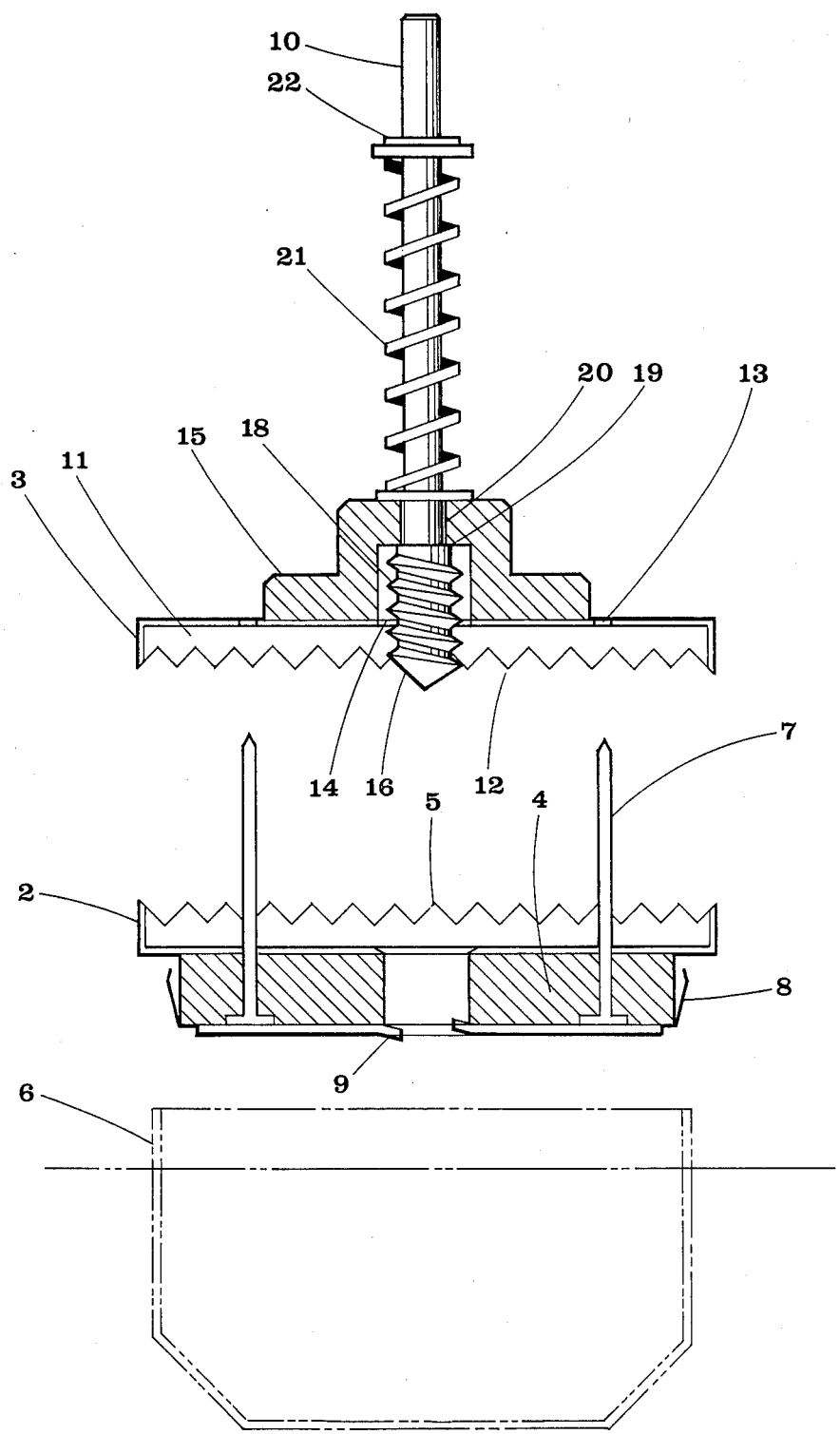
FIG. 1 is a partial cut-away drawing, showing the disclosed invention, a panel cutting tool.
Figure 2:
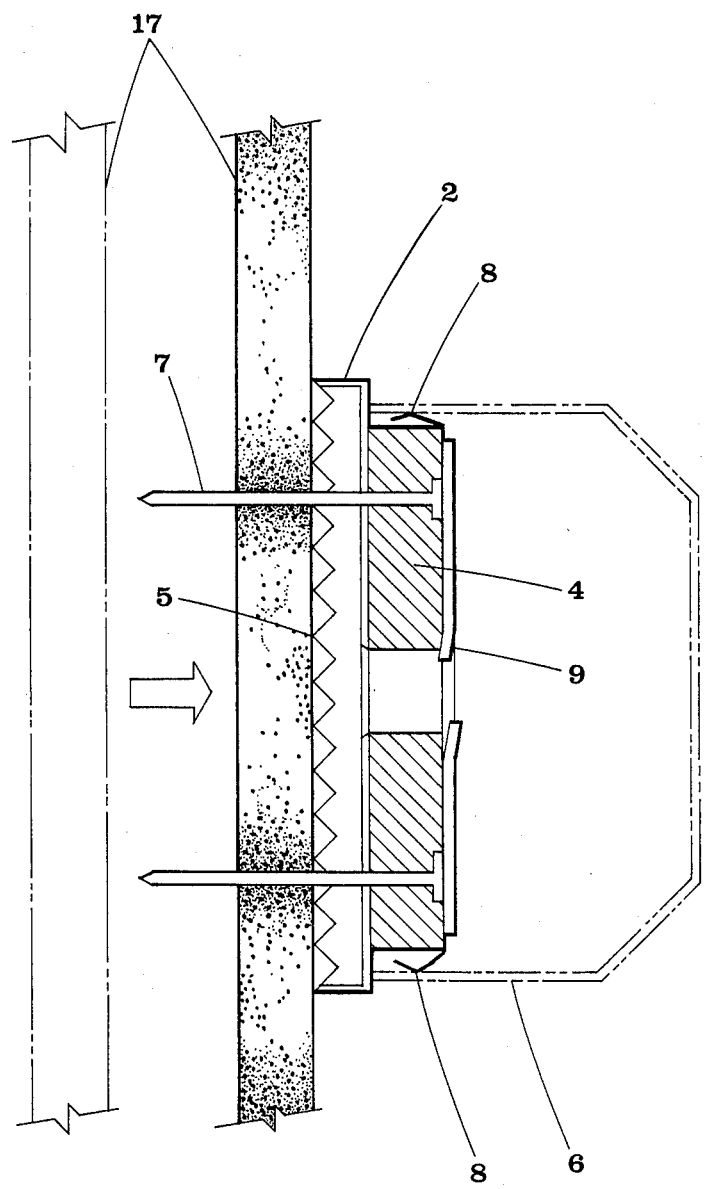
FIG. 2 is a partial cut-away drawing, showing the disclosed invention, with the interior cutting box positioned in a wall receptacle, with the panel to be cut in both a first position and a second position [fully pressed against the wall].
Figure 3:
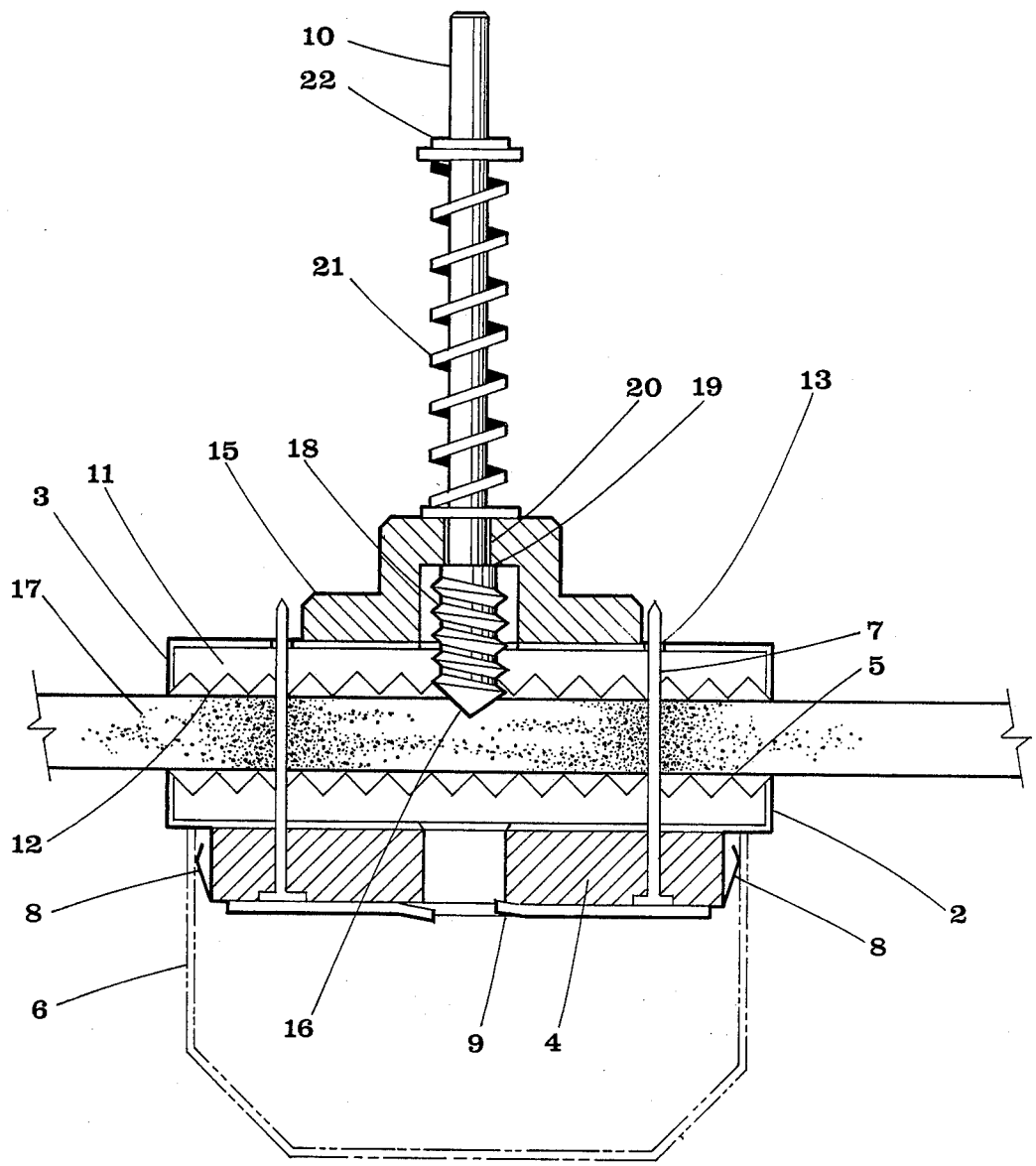
FIG. 3 is a partial cut-away drawing of the disclosed invention, showing the exterior cutting box positioned by the locating nails of the interior cutting box, and further with the outward end of the threaded connecting screw disposed in a drill.
Figure 4:
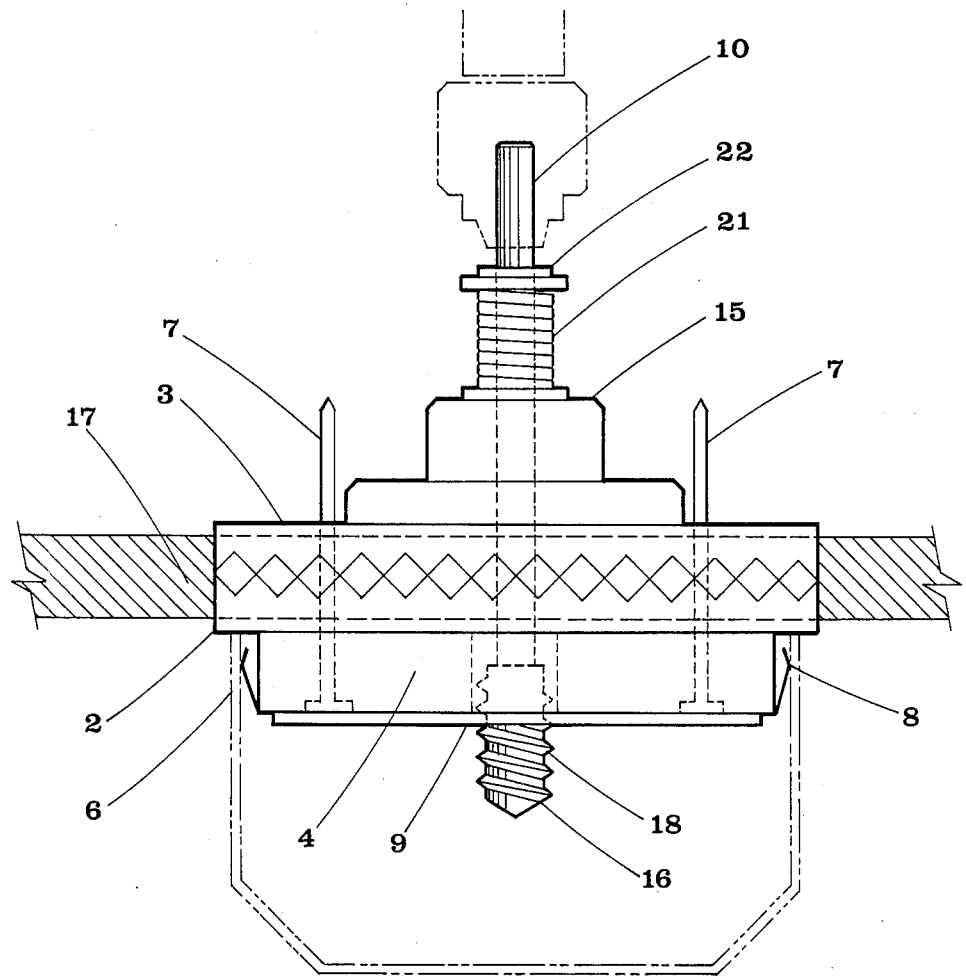
FIG. 4 is a partial cut-away drawing of the disclosed invention, showing the threaded connecting screw having drilled through the panel and having engaged the threaded hole in the interior cutting panel, the tool having cut through the panel material.
Figure 5:
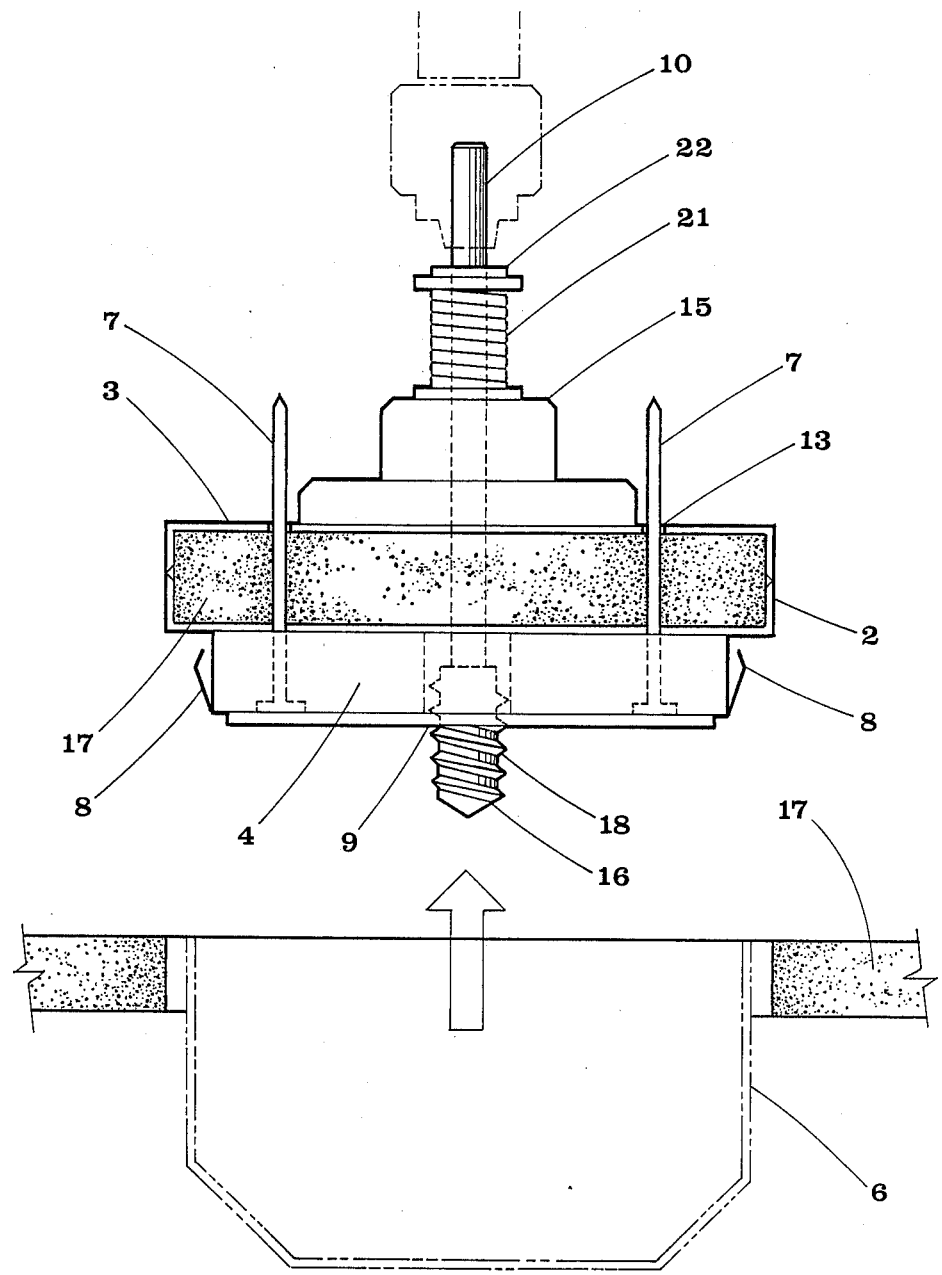
FIG. 5 is a partial cut-away drawing of the disclosed invention, showing the tool fully extracted from the receptacle having removed the cut material from the panel, leaving a fully completed cut.

The interior cutting box 2 is comprised of a rectangular shaped housing 4, said housing 4 having a plurality of forward projecting teeth 5 on its forward facing edge. As shown in FIGS. 1 and 2, the shape of the housing 4 and the teeth 5 is configured to match that of the receptacle outlet 6 hole to be cut. The interior cutting box 2 also has a pair of locating nails 7 and a pair of retaining clips 8 for retaining the interior cutting box 2 in the outlet receptacle 6. The interior cutting box housing 4 also has a threaded hole 9 in its rearward portion, whose use in cooperation with a threaded screw 10 will be described in detail below.

The exterior cutting box 3 is comprised of a second rectangular shaped housing 11. This cutting box housing 11 has a plurality of rearward projecting teeth 12. The exterior cutting box housing 11 and the rearward projecting teeth 12 are also configured in the same shape as that of the interior cutting box housing 4 and teeth 5. The exterior cutting box housing 11 also has a pair of openings 13 positioned such that the locating nails 7 will pass through said openings 13 when the interior and exterior cutting boxes 2 and 3 are properly aligned with respect to one another. The exterior cutting box housing 11 also has a hole 14 for close passage of a threaded connecting shaft 10.

A threaded connecting shaft 10 is attached to the exterior cutting box housing 11 by means of a bracket 15 for that purpose, said bracket 15 attached to the outward side of the exterior cutting box housing 11. The inward projecting end 16 of the threaded connecting shaft 10 is pointed so as to facilitate the threaded connecting shaft 10 being drilled through the panel 17 [shown in FIGS. 2-5] so as to connect with the interior cutting box 2. The threaded connecting shaft 10 has threads 18 along the inward portion which cooperate with the threaded hole 9 in the interior cutting box housing 4, to pull the interior cutting box 2 toward the exterior cutting box 3 when fully engaged and threaded together.

In the preferred embodiment, the threaded connecting shaft 10 also has a shoulder 19 which cooperates with a close passage 20 in the bracket 15 in order to prevent the complete outward removal of the threaded connecting shaft 10 from the exterior cutting box housing 11 and bracket 15. Also, in the preferred embodiment, the threaded connecting shaft 10 is urged to an outward position by means of a compression spring 21, said spring 21 mounted around the body of the threaded connecting shaft 10 and held in position by cooperation between a retaining washer 22 positioned near the outward end of the threaded connecting shaft 10 and the bracket 15. The compression spring 21 urges the threaded connecting shaft 10 to an outward position, but allows the threaded connecting shaft 10 to move in a rearward direction when in use drilling through the panel 17 so as to connect the exterior cutting box 3 with the interior cutting box 2.

In operation, in order to practice the steps of the method of this invention, the following steps are followed.

The first step is comprised of placing the interior cutting box 2 in the outlet receptacle 6, both the interior and exterior cutting box teeth being configured to cut a hole substantially the same size as the hole to be cut in the panel 17. The retaining clips 8 on the sides of the interior cutting box housing 4 engage the interior wall of the outlet 6 to retain the interior cutting box 4 in the outlet 6.

The second step is comprised of positioning the panel 17 on the wall and pressing it into place, thus causing the locating nails 7 to pierce the panel 17 and be exposed on the outward side of the panel 17.

The third step is comprised of securely fastening the panel 17 to the wall in its proper position.

The fourth step is comprised of positioning the exterior cutting box 3 with respect to the panel 17 and the interior cutting box 2 by means of locating the exterior cutting box 3 on the locating nails 7 through the openings in the exterior cutting housing 4.

The fifth step is comprised of attaching a drill to the outward end of the threaded connecting shaft.

The sixth step is comprised of then drilling through the panel 17, allowing the threaded connecting shaft 10 pointed end 16 to engage the threaded hole 9 in the interior cutting box housing 4, thereby allowing the interior 5 and the exterior 12 cutting teeth to cut through the panel 17, toward each other, cutting a hole of the precise dimension and position necessary to expose the wall outlet 6.

The seventh step is comprised of removing the cutting tool, along with the material cut from the panel, from the hole.

It should be understood that while the disclosed invention has been described in conjunction with cutting electrical wall outlet holes in masonary and dry wall panels, it should be understood that the device may be used to cut holes of any given configuration or size in any number of materials where it is required to precisely cut a hole in a precise position in a panel or workpiece which must be precisely placed in some location.

I claim:

1. An apparatus for cutting holes for electrical wall outlets of predetermined size, shape and location in wall covering panels, said apparatus comprised of:
   an interior cutting box, said interior cutting box having a rectangular shaped base, said base having a threaded hole, and four forward projecting sidewalls shaped to closely fit into the electrical outlet housing, the sidewalls having a plurality of cutting teeth on the outward projecting edge of said cutting box, said teeth for cutting through the panel wall froom the rearward side forward;
   a plurality of aligning fingers, said aligning fingers having the rearward ends perpendicularly fastened to the base of the cutting box and having pointed forward ends such that the aligning fingers can pass through a wall panel when the wall panel is pressed into place against the wall;
   a pair of retaining clips, said clips attached to the outer surface of the interior cutting box frame, said retaining clips spring loaded to retain the interior cutting box in the electrical outlet housing;
   an exterior cutting box, said exterior cutting box having;
      a rectangular shaped base and four rearward projecting sidewalls, the sidewalls having a plurality of cutting teeth on the projecting edges, the teeth for cutting through the panel wall from the forward side rearward, said exterior cutting box,
      a plurality of holes in said base of the exterior cutting box, the holes positioned so as to accept close passage of the aligning fingers when the exterior cutting box is properly aligned with the interior cutting box, exterior cutting box,
   further having a support bracket, said support bracket fixedly attached to the forward side of the base, said support bracket having a center passage;

a threaded connecting shaft being supported in close passage through said center passage of said support bracket and passing through said threaded hole in said interior cutting box, said threaded connecting shaft having a rearward projecting threaded and point end so as to drill a hole through the panel when pressed rotated against the panel wall;

a drill, said drill connected to the forward end of the shaft so as when activated, the drill rotates the threaded shaft;

a retaining washer, said washer located on the forward end of the shaft; said washer having a surface sufficient to retain a compression spring, and;

a compression spring, said spring located around the body of the threaded connecting shaft and positioned between the retaining washer and the bracket such that when the shaft is not being pressed forward to drill a hole through the panel, the compression spring pushes the threaded connecting shaft to a retracted position.

* * * * *